United States Patent
Breithaupt

(10) Patent No.: US 7,458,399 B2
(45) Date of Patent: Dec. 2, 2008

(54) METHOD FOR FILLING A DEFINED QUANTITY OF A MEDIUM INTO A CONTAINER

(75) Inventor: Hartmut Breithaupt, Schwäbisch-Hall (DE)

(73) Assignee: Endress + Hauser Flowtec AG, Reinach (CH)

( * ) Notice: Subject to any disclaimer, the term of this patent is extended or adjusted under 35 U.S.C. 154(b) by 259 days.

(21) Appl. No.: 10/538,184

(22) PCT Filed: Dec. 2, 2003

(86) PCT No.: PCT/EP03/13540

§ 371 (c)(1), (2), (4) Date: Feb. 6, 2006

(87) PCT Pub. No.: WO2004/053432

PCT Pub. Date: Jun. 24, 2004

(65) Prior Publication Data

US 2006/0254671 A1   Nov. 16, 2006

(30) Foreign Application Priority Data

Dec. 9, 2002   (DE) ............................... 102 57 593

(51) Int. Cl.
*B65B 1/04* (2006.01)
(52) U.S. Cl. ............................... 141/1; 141/128; 141/192
(58) Field of Classification Search ................... 141/67; 222/1, 4, 14, 71, 73, 63, 52
See application file for complete search history.

(56) References Cited

U.S. PATENT DOCUMENTS

| | | | | |
|---|---|---|---|---|
| 1,978,597 A | * | 10/1934 | Peter .......................... | 222/40 |
| 2,837,241 A | * | 6/1958 | Griswold ..................... | 222/52 |
| 2,919,834 A | * | 1/1960 | Rugeley et al. .............. | 222/52 |
| 3,220,608 A | * | 11/1965 | Porter ......................... | 222/63 |
| 3,570,717 A | * | 3/1971 | Olson .......................... | 222/52 |
| 3,851,795 A | * | 12/1974 | Anderson ..................... | 222/1 |
| 4,401,141 A | | 8/1983 | Rosen | |
| 4,565,511 A | * | 1/1986 | Ramisch ...................... | 425/146 |
| 4,967,557 A | * | 11/1990 | Izumi et al. .................. | 60/423 |
| 5,515,888 A | * | 5/1996 | Graffin ......................... | 141/1 |
| 5,975,747 A | * | 11/1999 | Flaherty ...................... | 700/240 |
| 5,992,686 A | * | 11/1999 | Cline et al. ................... | 222/1 |
| 6,065,508 A | * | 5/2000 | Ball et al. ..................... | 141/67 |
| 6,070,760 A | * | 6/2000 | Kenney et al. ................ | 222/55 |
| 6,126,039 A | * | 10/2000 | Cline et al. ................... | 222/63 |
| 6,161,723 A | * | 12/2000 | Cline et al. ................... | 222/1 |
| 6,499,517 B2 | * | 12/2002 | Hansen ........................ | 141/196 |
| 6,675,988 B2 | * | 1/2004 | Cline et al. ................... | 222/55 |

(Continued)

FOREIGN PATENT DOCUMENTS

DE    197 01 001    7/1998

(Continued)

*Primary Examiner*—Timothy L. Maust
*Assistant Examiner*—Jason K Niesz
(74) *Attorney, Agent, or Firm*—Bacon & Thomas, PLLC

(57) ABSTRACT

In a method for filling a defined quantity of medium into a container, a shut-off signal for a feed pump and closing signal for a metering valve are set such that, in the closing of the metering valve, the pressure in the section of the pipeline before the metering valve remains essentially constant. In this way, the accuracy of the filling unit can be significantly improved.

3 Claims, 3 Drawing Sheets

Functional description

U.S. PATENT DOCUMENTS

| | | | |
|---|---|---|---|
| 6,782,327 B2 * | 8/2004 | Nishijima | 702/50 |
| 7,225,946 B2 * | 6/2007 | Gardos | 222/1 |
| 2001/0000611 A1 * | 5/2001 | Cline et al. | 222/1 |
| 2002/0014496 A1 * | 2/2002 | Cline et al. | 222/1 |
| 2004/0104244 A1 * | 6/2004 | Cline et al. | 222/63 |
| 2006/0209115 A1 * | 9/2006 | Espasa et al. | 347/17 |
| 2007/0215639 A1 * | 9/2007 | Roberts et al. | 222/61 |
| 2007/0251597 A1 * | 11/2007 | Breithaupt | 141/83 |

FOREIGN PATENT DOCUMENTS

| | | |
|---|---|---|
| DE | 198 34900 | 2/2000 |

* cited by examiner

Functional description

METHOD FOR FILLING A DEFINED QUANTITY OF A MEDIUM INTO A CONTAINER

BACKGROUND OF THE INVENTION

Field of the Invention

The invention concerns a method for filling a defined quantity of medium into a container.

In many areas of the foods and pharmaceuticals industries, filling units are used for filling a defined quantity of medium into a containment. An essential requirement of these filling units is to maintain fill quantity constant as filling times become increasingly shorter.

SUMMARY OF THE INVENTION

In the case of beverage bottling units, up to 65,000 bottles per hour can be filled. A further essential requirement of these filling units is the precision and reproducibility of a single filling. Each overfilling means a financial loss for the plant operator.

In the case of known filling units, in order to guarantee the reproducibility of the filled quantity of the medium, a metering valve in a supply line is opened at a given point in time, and then closed again at a precisely determined later point in time. The volume- or mass-flow of the medium, for instance the flow rate, is determined, respectively, by means of a volume- or mass-flow meter. The volume-flow meter can be, for example, a "Promag 53" or a "Dosimag 2." The mass-flow meter can be, for example, a "Promass 83" or a "Dosimass 2." Both of these device types are sold by the firm Endress+Hauser.

Fill quantity is determined on the basis of the value of flow supplied by the measuring device. As soon as the predetermined quantity of medium is filled into the containment, the metering valve is closed. The pre-run and after-run quantities, that is, the fill quantities filled into the containment when the metering valve is, respectively, not fully open and not fully closed, are determined based on values taken from experience, or on the basis of experimentally obtained values, and are taken into consideration in the filling process.

A constant fill quantity can be attained only when the pressure in the supply line remains essentially constant. This is presently achieved by providing a so-called buffer tank, from which the quantity of medium to be filled is taken. The size of the buffer tank is selected such that the quantity of medium for a single filling does not markedly alter the fill level in the buffer tank.

In order to keep the fill level in the buffer tank essentially constant, a feed pump is provided, which supplies medium into the buffer tank. Such buffer tanks have a number of disadvantages. For example, they are expensive, must be cleaned, and require a considerable amount of space.

An object of the invention is to provide a method for filling a defined quantity of medium into a containment, which method requires no buffer tank, or, alternatively, a considerably smaller buffer tank than conventional filling units.

An essential idea of the invention is to keep the pressure in the supply line essentially constant. To do this, the supply position of the feed pump is registered, and the shut-off signal for the feed pump and the closing signal for the metering valve are appropriately coordinated with one another such that the pressure in the supply line is held essentially constant.

BRIEF DESCRIPTION OF THE DRAWINGS

The invention will now be described in greater detail on the basis of an example of an embodiment illustrated in the drawing, the figures of which show as follows.

DESCRIPTION OF THE PREFERRED EMBODIMENTS

Figure 1:
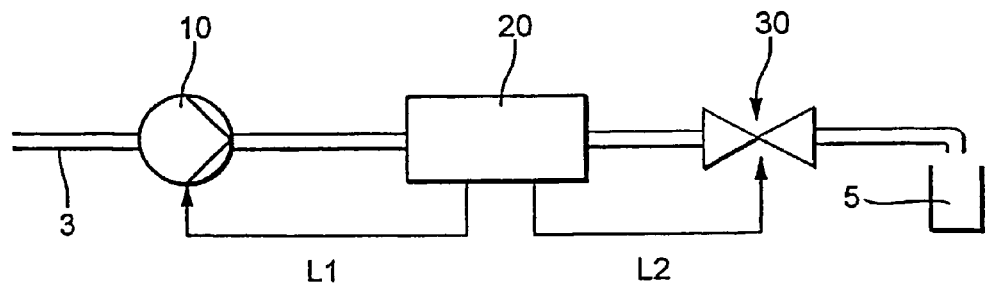
FIG. 1 schematic illustration of a filling unit suitable for implementation of the method of the invention.

FIG. 1 shows a schematic illustration of a filling unit suitable for implementing the method of the invention. Medium is directed/fed to the containment 5 via the supply line 3. The feed pump 10 drives the medium into the supply line 3 from another component (not shown) of the unit.

Flow in supply line 3 is determined with the help of the flow measuring device 20.

Examples of suitable volume-flow measuring devices are, for example, a "Promag 53" or a "Dosimag 2". Examples of suitable mass-flow measuring devices are, for example, a "Promass 83" or a "Dosimass 2". These two device types, sold by the firm Endress+Hauser, have already been described above. The flow quantity determined by the flow meter 20 serves for the metering of the fill quantity. As soon as the predetermined quantity of the medium is filled into the containment 5, the metering valve 30 is closed.

In order to assure that a defined fill quantity is filled into containment 6, a fill quantity control is used, which is implemented as a software program in a microprocessor of the flow meter 20. The necessary control commands are relayed, respectively, to the feed pump 10 and to the metering valve 30, via the control lines L1, L2. By opening the metering valve 30, the filling instance is initiated. As soon as the desired quantity of medium is filled into the containment 6, the filling instance is ended by closing the metering valve 30.

Figure 2:
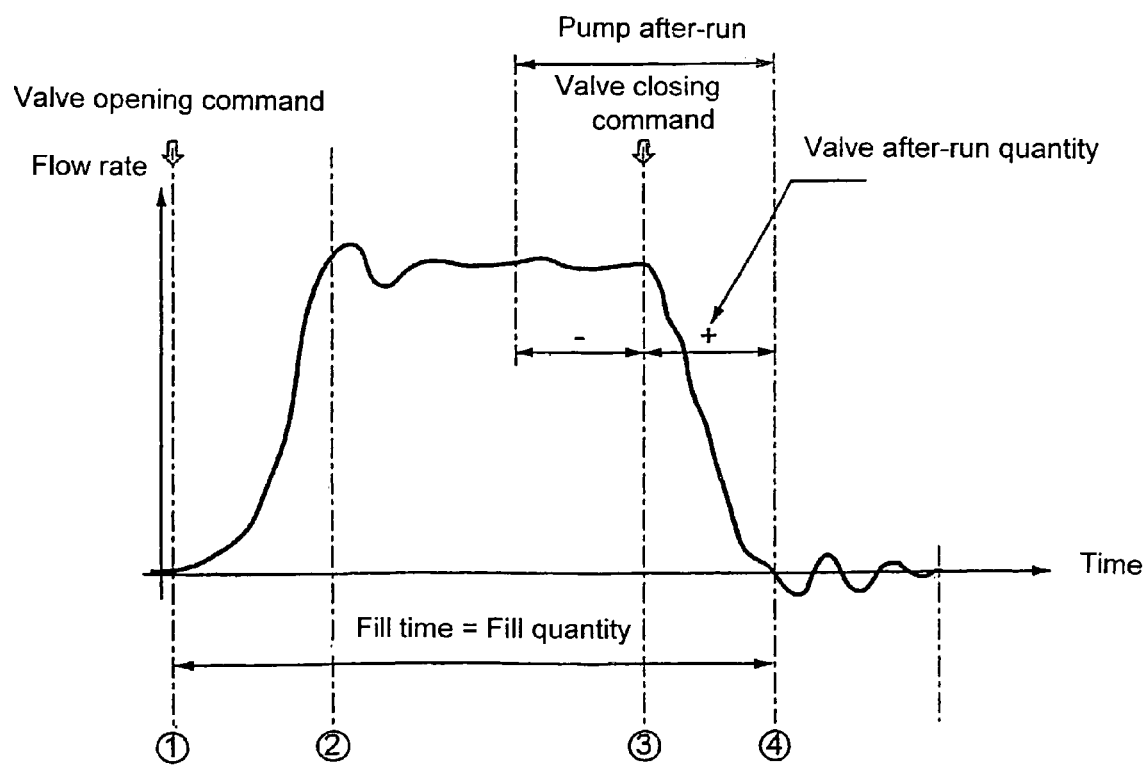
FIG. 2 typical plot of a fill curve in the case of a filling instance in a filling unit.

FIG. 2 shows a schematic illustration of a typical fill curve. Flow rate is plotted as a function of time. The numbers shown in the drawing represent the points in time of the followings steps of the method: 1. command, open metering valve; 2. metering valve is opened; 3. close metering valve; 4. metering valve is closed. The quantity of medium filled into the containment 5 corresponds to the area under the curve between points 1 and 4. If the pressure in the supply line 3 changes, then the curve changes to the effect that the approximately horizontal path of the curve between points 2 and 3 is shifted either upward or downward, and the fill quantity would be changed thereby.

The influence of the feed pump 10 on the filling process will now be described in greater detail. Feed pump 10 must be controlled such that the horizontal line between points 2 and 3 in the filling diagram has approximately the same height for all filling instances. This is achieved by coordinating the shut-off signal for the feed pump 10 with the closing signal for the metering valve 30. If the feed pump 10 supplies when the metering valve 30 is closed, then pressure will build in the supply line 3. At the next opening of the metering valve 30, a spurting of the medium results. Such spurting is very difficult to register with the known flow measuring devices. In such case, the measurement values delivered by the flow measuring device 20 are subject to considerable inaccuracies, and thus the close command for the metering valve 30 may not come at the correct point in time. Altogether, this would adversely affect the accuracy of the fill quantity.

In accordance with the invention, the supply position of the feed pump is registered, and the shut-off signal for the feed pump and the closing command for the metering valve are coordinated with one another such that the pressure in the supply line remains essentially constant. Here it is important that the after-run of the pump, that is, the time lag between the shut-off signal for the feed pump and actual stopping of the pump, is taken into consideration.

Therefore, in accordance with the invention, the chamber position of the feed pump 10 is registered, and the shut-off signal for the feed pump 10 and the closing command for the metering valve 30 are coordinated with one another. It is thereby assured that, after the closing of the metering valve 30, no additional pressure builds in the supply line 3. In this manner, the pressure in the supply line can be held constant, so that intermediate storage of the medium in a buffer tank is no longer necessary. In order to register the supply position of the feed pump, appropriate sensors are provided at the feed pump.

Figure 3A:
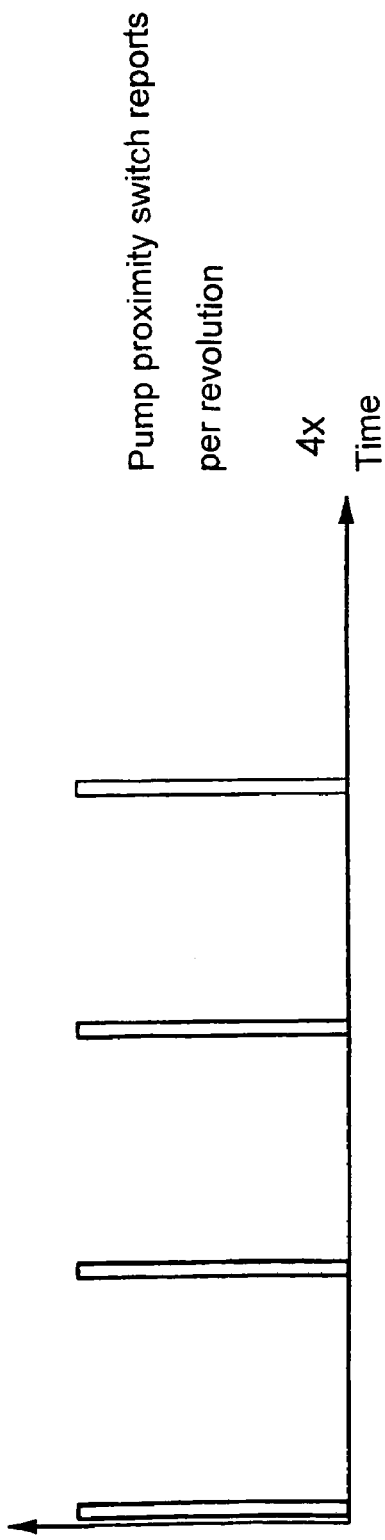
FIG. 3 signal for registering the supply position of a feed pump.
Figure 3B:
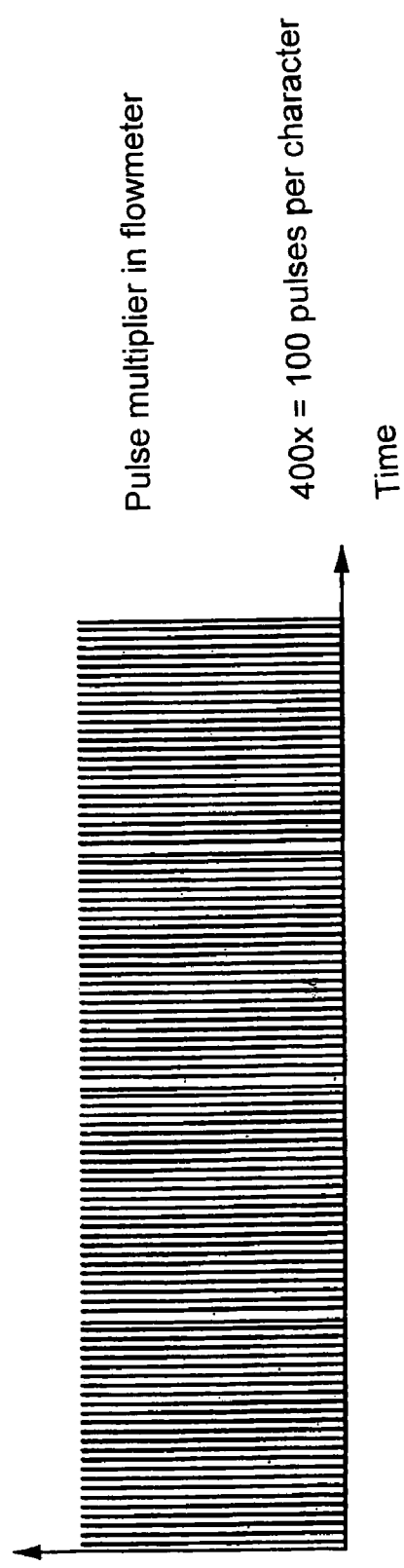

In FIG. 3*a*, the associated signal plot is illustrated. Per revolution of the pump, four pulses are produced. In order to have very accurate information concerning the supply position of the pump, the signal of FIG. 3*a* is multiplied with appropriate pulse multipliers (e.g. ×100), so that the supply position of the feed pump 10 can be precisely determined at any point in time (FIG. 3*b*).

It has proven to be very advantageous to have the supply quantity of the feed pump following the shut-off signal correspond exactly to the after-run quantity of the metering valve 30.

Figure 4:
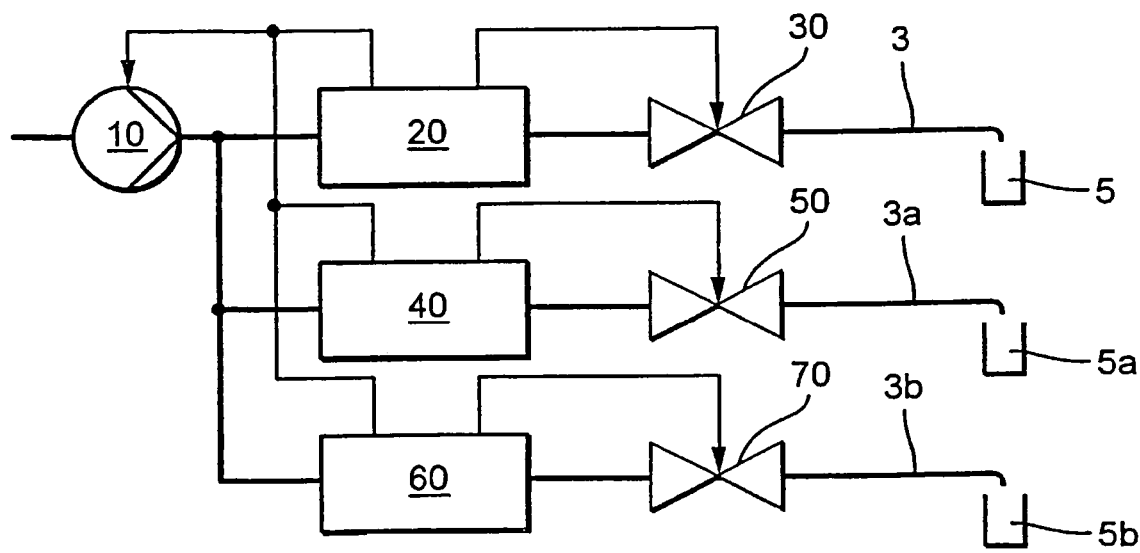
FIG. 4 schematic illustration of a filling unit as in FIG. 1, with multiple filling stations.

FIG. 4 shows a filling system in which the feed pump 10 serves multiple filling stations. Each filling station has flow meter 20, 40, 60 and a metering valve 30, 50, 70 for each containment 5, 5*a*, 5*b*. The filling station which is last to receive the close command for its metering valve controls the shut-off of the feed pump 10, that is, it takes over the master function. By way of example, a filling unit with three filling stations is shown. In principle, more than three filling stations can also be connected in parallel.

The invention claimed is:

1. A method for filling a defined quantity of medium into a container using a feed pump connected with a metering valve via a flow meter, comprising the steps of:
   controlling the fill quantity through the opening and closing of the metering valve; and
   determining the shut-off signal for the feed pump and the closing signal for the metering valve such that, when the metering valve is closed, the pressure in a section of the supply line arranged between the feed pump and the metering valve is held approximately constant, wherein:
   the supply quantity of the feed pump following the shut-off signal corresponds to the after-run quantity of the valve.

2. The method as claimed in claim 1, wherein:
   a buffer tank is arranged between the feed pump and the metering valve.

3. The method as claimed in claim 1, further comprising the step of:
   registering the supply position of the feed pump with the help of one or more sensors.

* * * * *